United States Patent [19]
Benz et al.

[11] Patent Number: 5,683,653
[45] Date of Patent: Nov. 4, 1997

[54] SYSTEMS FOR RECYCLING OVERSPRAY POWDER DURING SPRAY FORMING

[75] Inventors: Mark Gilbert Benz, Burnt Hills; William Thomas Carter, Jr., Galway; Paul Leonard Dupree, Scotia; Bruce Alan Knudsen, Amsterdam; Robert John Zabala, Schenectady, all of N.Y.

[73] Assignee: General Electric Company, Schenectady, N.Y.

[21] Appl. No.: 537,579

[22] Filed: Oct. 2, 1995

[51] Int. Cl.$^6$ .................................................. C21C 1/00
[52] U.S. Cl. .................................. 266/202; 266/201
[58] Field of Search ............................ 266/202, 201; 427/30; 75/10.24, 10.11

[56] References Cited

U.S. PATENT DOCUMENTS

| | | | |
|---|---|---|---|
| 2,837,790 | 12/1958 | Rozian | 266/202 |
| 3,356,489 | 12/1967 | Feichtinger | 266/202 |
| 3,519,059 | 7/1970 | Voskoboinikov et al. | 266/202 |
| 3,650,518 | 3/1972 | Moffatt | 266/202 |
| 3,779,743 | 12/1973 | Olsson et al. | 266/202 |
| 3,817,503 | 6/1974 | Lafferty et al. | 266/202 |
| 3,826,301 | 7/1974 | Brooks | 164/46 |
| 3,868,987 | 3/1975 | Galey et al. | 164/52 |
| 3,909,921 | 10/1975 | Brooks | 29/527.2 |
| 3,911,161 | 10/1975 | Nord et al. | 427/30 |
| 3,951,577 | 4/1976 | Okayama et al. | 425/7 |
| 3,988,084 | 10/1976 | Esposito et al. | 425/7 |
| 4,575,325 | 3/1986 | Duerig et al. | 425/7 |
| 4,619,597 | 10/1986 | Miller | 425/7 |
| 4,619,845 | 10/1986 | Ayers et al. | 427/422 |
| 4,631,013 | 12/1986 | Miller | 425/7 |
| 4,779,802 | 10/1988 | Coombs | 239/292 |
| 4,801,412 | 1/1989 | Miller | 264/12 |
| 4,926,923 | 5/1990 | Brooks et al. | 164/5 |
| 5,004,153 | 4/1991 | Sawyer | 239/81 |
| 5,160,532 | 11/1992 | Benz et al. | 266/202 |
| 5,196,049 | 3/1993 | Coombs et al. | 266/202 |
| 5,348,566 | 9/1994 | Sawyer et al. | 75/10.24 |
| 5,366,204 | 11/1994 | Gigliotti, Jr. et al. | 266/202 |

*Primary Examiner*—Scott Kastler
*Attorney, Agent, or Firm*—Noreen C. Johnson; William H. Pittman

[57] ABSTRACT

A system for the recycling of overspray powder during spray forming is provided. The system involves providing a refining vessel to contain an electroslag refining layer floating on a layer of molten refined metal. An ingot of unrefined metal is lowered into the vessel into contact with the molten electroslag layer. A current is passed through the slag layer to the ingot to cause surface melting at the interface between the ingot and the electroslag layer. As the ingot is surface melted at its point of contact with the slag, droplets of the unrefined metal are formed and these droplets pass down through the slag and are collected in a body of molten refined metal beneath the slag. The refined metal is held within a cold hearth. At the bottom of the cold hearth, a cold finger orifice permits the withdrawal of refined metal from the cold hearth apparatus. The refined metal passes from the cold finger orifice as a stream. The stream is atomized for spray forming into a preform article on a spray collection station having a solid receiving surface for receiving the atomized metal thereon to form the preform article. The powder produced during the atomization which was not deposited on the solid receiving surface of the spray collection station is recycled onto the top of the molten slag in the electroslag refining station.

11 Claims, 1 Drawing Sheet

SYSTEMS FOR RECYCLING OVERSPRAY POWDER DURING SPRAY FORMING

This application is related to commonly assigned U.S. patent application Ser. No. 08/537,577 filed Oct. 2, 1995, of Carter, Jr. et al., the disclosure of which is hereby incorporated by reference.

BACKGROUND OF THE INVENTION

The present invention relates generally to systems for the direct processing of metal passing through an electroslag refining operation. More specifically, it relates to systems for atomizing or otherwise directly processing a stream of metal which stream is generated directly beneath an electroslag processing apparatus. Most specifically, it relates to systems for the reprocessing of the solidified metal, overspray powder, produced during a spray forming process but which did not become attached to the preform.

It is known that processing relatively large bodies of metal, such as superalloys, is accompanied by many problems which derive from the bulky volume of the body of metal itself. Such processing involves problems of sequential heating and forming and cooling and reheating of the large bodies of the order of 5,000 to 35,000 pounds or more in order to control grain size and other microstructure. Such problems also involve segregation of the ingredients of alloys in large metal bodies as processing by melting and similar operations is carried out. In the past, a sequence of processing operations was sometimes selected in order to overcome the difficulties which arise through the use of bulk processing and refining operations.

One such past sequence of steps involved a sequence of vacuum induction melting followed by electroslag refining and followed, in turn, by vacuum arc refining and followed, again in turn, by mechanical working through forging and drawing types of operations. While the metal produced by such a sequence of steps was highly useful and the metal product itself is quite valuable, the processing through the several steps was expensive and time-consuming.

For example, the vacuum induction melting of scrap metal into a large body of metal of 20,000 to 35,000 pounds or more can be very useful in recovery of the scrap material. The scrap may be combined with virgin metal to achieve a nominal alloy composition desired and also to render the processing economically sound. The size range is important for scrap remelting economics. According to this process, the scrap and other metal is processed through the vacuum induction melting steps so that a large ingot is formed and this ingot has considerably more value than the scrap and other material used in forming the ingot. Following this conventional processing, the large ingot product is usually found to contain one or more of three types of defects and specifically voids, non-metallic inclusions and macrosegregation.

This recovery of scrap into an ingot was the first step in a refining process which involves several sequential processing steps. Some of these steps were included in the subsequent processing specifically to cure the defects generated during the prior processing. For example, such a large ingot may then be processed through an electroslag refining step to remove a significant portion of the oxide and sulfide inclusions which may be present in the ingot.

Electroslag refining is a well-known process which has been used industrially for a number of years. Such a process is described, for example, on pages 82–84 of a text on metal processing entitled "Superalloys, Supercomposites, and Superceramics". This book is edited by John K. Tien and Thomas Caulfield and is published by Academic Press, Inc. of Harcourt Brace Jovanovich, and bears the copyright of 1989. The use of this electroslag refining process is responsible for removal of oxide, sulfide and other impurities from the vacuum induction melted ingot so that the product of the processing has lower concentrations of these impurities. The product of the electroslag refining is also largely free of voids and non-metallic inclusions.

However, a problem arose in the electroslag refining process because of the formation of a relatively deep melt pool as the process is carried out. The deep melt pool, which has a relatively slow solidification rate, resulted in a degree of ingredient macrosegregation and in a less desirable microstructure. Defects produced by macrosegregation were visually apparent and were called "freckles". One way to reduce freckles was by reducing the diameter of the formed ingot but such reduction could also adversely affect economics of the processing.

To overcome this deep melt pool problem, a subsequent processing operation was employed in combination with the electroslag refining, particularly to reduce the depth of the melt pool and the segregation and microstructure problems which result from the deeper pool. This latter processing was a vacuum arc refining and it was also carried out by a conventional and well-known processing technique.

The vacuum arc refining started with the ingot produced by the electroslag refining and processes the metal through the vacuum arc steps to produce a relatively shallow melt pool and to produce better microstructure, and possibly a lower nitrogen content, as a result. Again, for reasons of economic processing, a relatively large ingot of the order of 10 to 40 tons was processed through the electroslag refining and then through the vacuum arc refining. However, the large ingots of this processing has a large grain size and may contain defects called "dirty" white spots.

Following the vacuum arc refining, the ingot of this processing was then mechanically worked to yield a metal stock which has better microstructure. Such a mechanical working may, for example, involve a combination of steps of forging and drawing to lead to a relatively smaller grain size. The thermomechanical processing of such a large ingot requires a large space on a factory floor and requires large and expensive equipment as well as large and costly energy input.

As was indicated above in describing the background of this art, one of the problems was that one processing step results in some deficiency in the product of that step so that another processing step was combined with the first in order to overcome the deficiency of the initial or earlier step in the processing. However, when the necessary combination of steps was employed, a successful and beneficial product with a desirable microstructure was produced. The drawback of the use of this recited combination of processing steps was that very extensive and expensive equipment was needed in order to carry out the sequence of processing steps and further a great deal of processing time and heating and cooling energy was employed in order to carry out each of the processing steps and to go from one step to the next step of the sequence as set forth above.

The processing as described above has been employed in the application of superalloys such as IN-718 and René 95. For some alloys the sequence of steps has led to successful production of alloy billets, the composition and crystal structure of which are within specifications so that the alloys can be used as produced. For other superalloys, and specifically for the René 95 alloy, it was usual for metal processors to complete the sequence of operations leading to specification material by adding the processing through powder metallurgy techniques. Where such powder metallurgical techniques were employed, the first steps in completing the sequence are the melting of the alloy and gas atomization of the melt. This was followed by screening the powder which was produced by the atomization. The selected fraction of the screened powder was then conventionally enclosed within a can of soft steel, for example, and the can was Hot Isostatically Pressed or HIPed to consolidate the powder into a useful form. Such HIPing may be followed by extruding or other conventional processing steps to bring the consolidated product to a usable form.

An alternative to the powder metallurgy processing as described immediately above is a conventional process known as spray forming. Spray forming has been described in a number of patents including the U.S. Pat. Nos. 3,909,921; 3,826,301; 4,926,923; 4,779,802; 5,004,153; as well as a number of other such patents.

Spray forming is a process using gas atomization to make a spray of droplets of liquid metal followed by solidification of the spray on a solid body to directly form a billet or billet preform. This process was originally developed by Osprey Metals, Ltd.

In general, the spray forming process has been gaining additional industrial use as improvements have been made in processing, particularly because it involves fewer steps and has a cost advantage over conventional powder metallurgy techniques so there is a tendency toward the use of the spray forming process where it yields products which are comparable and competitive with the products of the conventional powder metallurgy processing. An unavoidable byproduct of spray forming is overspray, which is the metal that solidifies in flight, without attaching to the preform. This overspray has in the past been collected in powder form and has been remelted or HIPed for commercial use.

Since the overspray results in some inefficiencies in the spray forming operations performed in the direct processing of electroslag refined metal, a system for recycling such overspray and reprocessing it directly into the electroslag refining apparatus would be desirable as opposed to having it remelted or HIPed in a separate process. Such system should provide for the injection of the overspray powder directly back into the electroslag refining apparatus, such as for example, onto the top of the slag in the ESR furnace where the powder would melt, drop through the slag, and pour through the CIG nozzle. Such system should also be relatively simple, inexpensive and easy to implement as well as possibly resulting in significant cost savings.

SUMMARY OF THE INVENTION

In one of its broader aspects, objects of the invention can be achieved by providing a system for producing refined metal alloy comprising: an electroslag refining apparatus including a refining vessel adapted to receive and to hold a refining molten slag; a body of molten slag in the vessel means for positioning an ingot in touching contact with the molten slag; electric supply means for supplying refining current to an ingot and through the molten slag to a body of refined metal beneath the slag to keep the refining slag molten; means for advancing the ingot toward and into contact with the molten slag at a rate corresponding to the rate at which the contacted surface of the electrode is melted as the refining thereof proceeds; a cold hearth vessel, operatively positioned beneath the electroslag refining apparatus, for receiving and holding electroslag refined molten metal in contact with a solid skull of the refined metal formed on the walls of the cold hearth vessel; a body of refined molten metal in the vessel beneath the body of molten slag; a cold finger apparatus having a bottom pour orifice operatively positioned below the cold hearth for receiving and dispensing the refined molten metal processed through the electroslag refining process and through the cold hearth as a stream; means for atomizing the electroslag refined metal which has exited the bottom pour orifice of the cold finger apparatus; means for collecting the powder produced during the atomization which and not deposited on a solid receiving surface of a spray collection station; and means, operatively connected to the system, for recycling the powder collected in the collecting means into the electroslag refining apparatus.

It is, accordingly, one object of the present invention to provide a system for collecting overspray powder that results from spray forming operations.

Another object is to provide a system for recycling the collected overspray powder into the electroslag refining process.

Other objects and advantages of the invention will be apparent from the following description, the accompanying drawings and the appended claims.

DETAILED DESCRIPTION OF THE INVENTION

Figure 1:
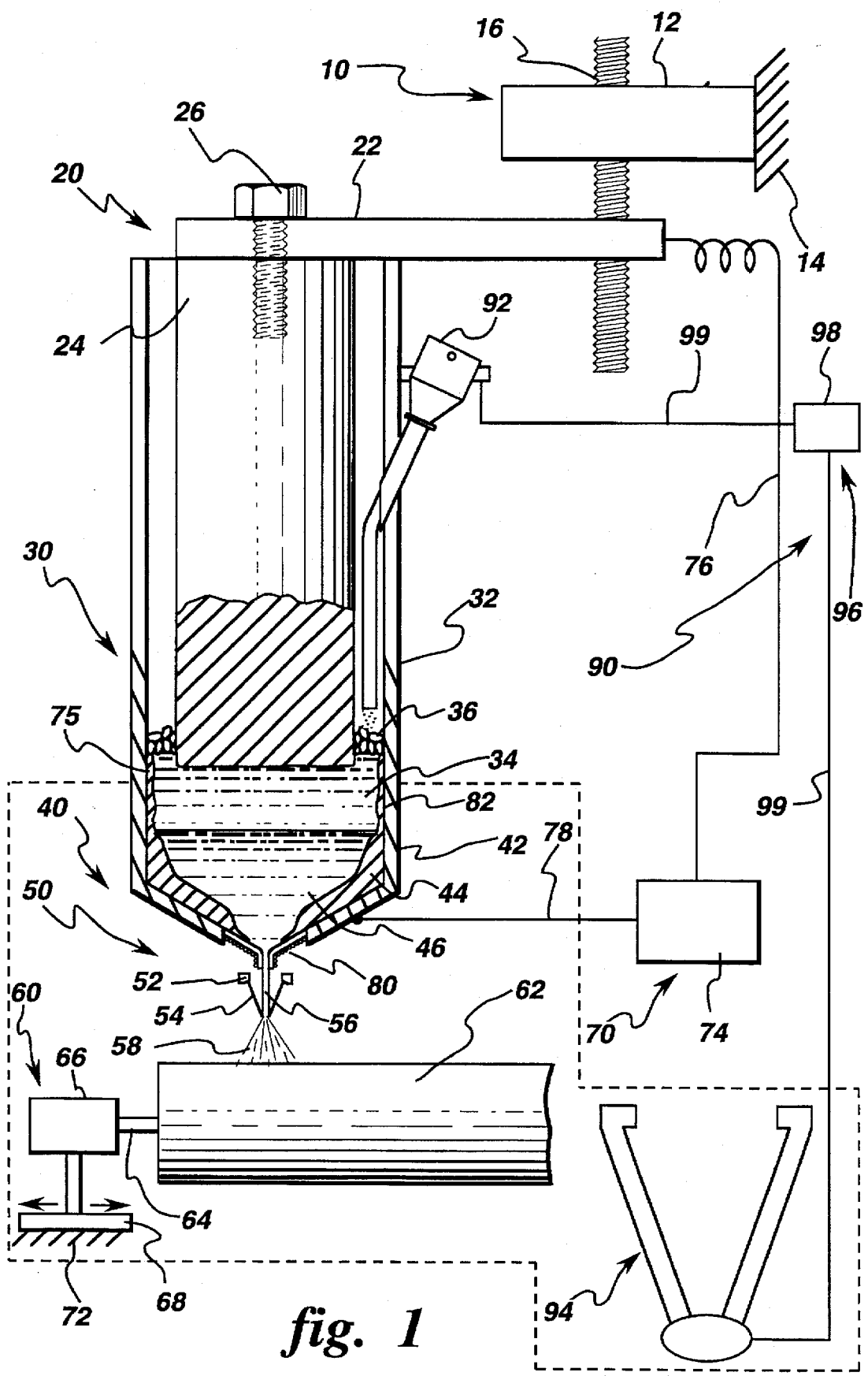
FIG. 1 is a semischematic vertical sectional view of an apparatus suitable for carrying out the present invention.

The direct processing of Electroslag refined metal is carried out by introducing an ingot of metal to be refined directly into an electroslag refining apparatus and refining the metal to produce a melt of refined metal which is received and retained within a cold hearth apparatus mounted immediately below the electroslag refining apparatus. The molten metal is dispensed from the cold hearth through a cold finger orifice mounted directly below the cold hearth reservoir.

If the rate of electroslag refining of metal and accordingly the rate of delivery of refined metal to a cold hearth approximates the rate at which molten metal is drained from the cold hearth through the cold finger orifice, an essentially steady state operation is accomplished in the overall apparatus and the process can operate continuously for an extended period of time and, accordingly, can process a large bulk of metal.

Once the metal is drained from the cold hearth through the cold finger orifice, it may be further processed to produce a relatively large ingot of refined metal or it may be processed through alternative processing steps to produce smaller articles or continuous cast articles such as strip or rod or similar metallurgical products. Amorphous alloy products may be produced by processing a thin stream of melt exiting from the said finger orifice through a melt spinning operation in which the stream is directed onto the outer rim of a spinning water cooled wheel. A very important aspect of the direct processing of Electroslag refined metal is that it effectively eliminates many of the processing operations such as those described in the background statement of U.S. Pat. No. 5,160,532, the disclosure of which is hereby incorporated by reference, which had been necessary in order to produce a metal product having a desired set of properties.

The processing described herein is applicable to a wide range of alloys which can be processed beneficially through the electroslag refining processing. Such alloys include nickel- and cobalt-based superalloys, titanium-based alloys, and ferrous-based alloys, among others. The slag used in connection with such metals will vary with the metal being processed and will usually be the slag conventionally used with a particular metal in the conventional electroslag refining thereof.

One of the several processing techniques which may be combined with the apparatus as described immediately above is a spray-forming operation. Spray forming is a process using gas atomization to make a spray of droplets of liquid metal followed by solidification of the spray on a solid body to directly form a billet or billet preform.

Such spray forming may be employed to form conventional spray-formed products or it may be employed to form relatively large objects because the ingot which can be processed through the combined electroslag refining and cold hearth and cold finger mechanism can be a relatively large supply ingot and can, accordingly, produce a continuous stream of metal exiting from the cold finger orifice over a prolonged period to deliver a large volume of molten metal.

An illustrative apparatus is described below with particular reference to the processing through a spray-forming operation. Referring now particularly to the accompanying drawings, FIG. 1 is a semischematic elevational view in part in section of a number of the essential and auxiliary elements of apparatus for carrying out the present invention. As shown in FIG. 1, there are a number of processing stations and mechanisms and these are described starting at the top.

A vertical motion control apparatus 10 is shown schematically. It includes a box 12 mounted to a vertical support 14 and containing a motor or other mechanism adapted to impart rotary motion to the screw member 16. An ingot support station 20 comprises a bar 22 operatively connected, for example, threadedly engaged at one end to the member 16 and supporting the ingot 24 at the other end by conventional means 26, such as, for example, a bolt.

An electroslag refining station 30 comprises a water cooled reservoir 32 containing a molten slag 34 an excess of which is illustrated as the solid slag granules 36. A skull of slag 75 may form along the inside surfaces of the inner wall 82 of vessel 32 due to the cooling influence of the cooling water flowing against the outside of inner wall 82.

A cold hearth station 40 is mounted immediately below the electroslag refining station 30 and it includes a water cooled hearth 42 containing a skull 44 of solidified refined metal and also a body 46 of liquid refined metal. Water cooled reservoir 32 may be formed integrally with water cooled hearth.

The bottom opening structure 80 of the crucible is provided in the form of a cold finger orifice which is described more fully in the above referenced U.S. Pat. No. 5,160,532. An atomization station 50 is provided in one form immediately below the cold hearth station 40 and cold finger orifice. This station has a gas orifice and manifold 52 which generates streams of gas 54. These streams impact on a stream of liquid metal 56 exiting from cold finger structure 80 to produce a spray 58 of molten metal. It should be understood that an atomization system, similar to that disclosed in U.S. Pat. No. 5,366,206, the disclosure of which is hereby incorporated by reference, could be connected to the cold finger orifice.

The lowest station 60 is a spray collection station which has a solid receiving surface such as that on the ingot 62. The ingot is supported by a bar 64 mounted for rotary movement on motor 66 which, in turn, is mounted to a reciprocating mechanism 68 mounted, in turn, on a structural support 72. The spray forming may use the scanning technique as described in copending application Ser. No. 07/753,497, filed Sep. 3, 1991.

Electric refining current is supplied by station 70. The station includes the electric power supply and control mechanism 74. It also includes the conductor 76 carrying current to the bar 22 and, in turn, to ingot 24. Conductor 78 carries current to the metal vessel wall 32 to complete the circuit of the electroslag refining mechanism.

In operation, one feature of the invention, as illustratively shown in FIG. 1, concerns the throughput capacity of the apparatus. As is indicated, the ingot 24 of unrefined metal may be processed in a single pass through the electroslag refining and related apparatus and through the atomization station of 50 to form a relatively large volume ingot 62 through the spray forming processing. Very substantial volumes of metal can be processed through the apparatus because the starting ingot 24 has a relatively small concentration of impurities such as oxide, sulfides, and the like, which are to be removed by the electroslag refining process. The ingot 62 formed by the processing as illustrated in FIG. 1 is a refined ingot and is free of the oxide, sulfide, and other impurities which are removed by the electroslag refining of station 30 of the apparatus of FIG. 1. It is, of course, possible to process a single relatively large scale ingot through the apparatus and to weld the top of ingot 24 to the bottom of a superposed ingot to extend the processing of ingots through the apparatus of FIG. 1 to several successive ingots.

Spray forming is a process using gas atomization to make a spray of droplets of liquid metal followed by solidification of the spray on a solid body to directly form a billet or billet preform.

In general, as discussed in the background, the spray forming process described above, has been gaining additional industrial use as improvements have been made in processing, particularly because it involves fewer steps and has a cost advantage over conventional powder metallurgy techniques so there is a tendency toward the use of the spray forming process where it yields products which are comparable and competitive with the products of the conventional powder metallurgy processing. As also discussed in the background, an unavoidable byproduct of spray forming is overspray, which is the metal that solidifies in flight, without attaching to the preform which had in the past been collected in powder form and had been remelted or HIPed for commercial use.

Since the overspray resulted in some inefficiencies in the spray forming operations performed in the direct processing of electroslag refined metal, a system for recycling such overspray and reprocessing it directly into the electroslag refining apparatus was developed.

As shown in FIG. 1, an overspray recycling means 90 is operatively positioned in the return tube 92 positioned in the metal vessel wall 32 of the electroslag refining of station 30 for recycling or injection of the overspray powder directly back into the electroslag refining apparatus, such for example, onto the top of the molten slag 34 an excess of which is illustrated as the solid slag granules 36 where the powder melts, drops through the slag, and then pours again through the bottom opening structure 80 of the crucible in the form of the cold finger orifice.

In order to facilitate the recovery of the overspray, means 94, such as, for example, a funnel can optionally be positioned in the bottom of the spray collection station 60 to collect the overspray powder produced during the spray forming operations.

Such overspray once collected can be manually transferred to the overspray recycling means 90 or can be automatically transported from the collecting means 94 to the overspray recycling means 90 in a conventional manner, such as for example, pneumatic transporting means 96, which could include a blower means 98 operatively connected to a conventional piping system 99 which connects the overspray recycling means 90 to the collecting means 94.

It should be understood that the system of the present invention could include intermediate processes such as, for example, means for spray drying the overspray powder in order to coat the agglomerates of the overspray powder with another material, such as, for example, slag. This should be accomplished between collecting the powder and prior to the overspray powder being recycled or injected directly back into the electroslag refining apparatus.

As can be seen, the system of the present invention described above for recycling the overspray and reprocessing it directly into the electroslag refining apparatus has eliminated having it remelted or HIPed in a separate process by providing for the injection of the overspray powder directly back into the electroslag refining apparatus onto the top of the slag in the ESR furnace where the overspray powder melts, drops through the slag and again pours through the crucible in the form of the cold finger orifice while being relatively simple, inexpensive and easy to implement as well as resulting in significant cost savings.

While the systems contained herein constitute preferred embodiments of the invention, it is to be understood that the invention is not limited to these precise systems, and that changes may be made therein without departing from the scope of the invention which is defined in the appended claims.

What is claimed is:

1. A system for producing refined metal alloy comprising:
   an electroslag refining apparatus including a refining vessel adapted to receive and to hold a refining molten slag;
   a body of molten slag in the vessel;
   means for positioning an ingot electrode in touching contact with the molten slag;
   electric supply means for supplying refining current to the ingot electrode and through the molten slag to a body of refined metal beneath the slag to keep the refining slag molten;
   means for advancing the ingot electrode toward and into contact with the molten slag at a rate corresponding to the rate at which the contacted surface of the ingot electrode is melted as the refining thereof proceeds;
   a cold hearth vessel, operatively positioned beneath the electroslag refining apparatus, for receiving and holding electroslag refined molten metal in contact with a solid skull of the refined metal formed on the walls of the cold hearth vessel;
   a body of refined molten metal in the vessel beneath the body of molten slag;
   a cold finger apparatus having a bottom pour orifice operatively positioned below the cold hearth for receiving and dispensing the refined molten metal processed through the electroslag refining process and through the cold hearth as a stream;
   means for atomizing the electroslag refined metal which has exited the bottom pour orifice of the cold finger apparatus;
   means for collecting any overspray powder produced during the atomization and not deposited on a solid receiving surface of a spray collection station; and
   means, operatively connected to the system, for recycling the overspray powder collected in the collecting means directly into the electroslag refining vessel for flow through said molten slag.

2. The system of claim 1 wherein the means for advancing the ingot is adapted to advance the ingot to be refined at the rate corresponding to the rate at which the refined molten metal is dispensed from the cold hearth.

3. The system of claim 1 wherein the recycling means further comprises:
   means, operatively positioned in the electroslag refining apparatus, for dispensing the overspray powder into the refining vessel.

4. The system of claim 1 further comprising:
   means, operatively connecting the collecting means and the recycling means, for transporting the overspray powder from the collecting means to the recycling means.

5. The system of claim 4 wherein the transporting means further comprises:
   pipe means; and
   blower means, operatively positioned relative to the collecting means, the recycling means and the pipe means, for transporting the overspray powder from the collecting means to the recycling means.

6. Apparatus for producing metal powder which comprises:
   electroslag refining apparatus comprising a refining vessel adapted to receive and to hold a metal refining molten slag;
   means for positioning an ingot electrode in the vessel in touching contact with the molten slag;
   electric supply means adapted to supply refining current to the ingot as an electrode and through the ingot and molten slag to a body of refined metal beneath the slag to keep the refining slag molten and to refine the metal of the ingot;
   means for advancing the ingot electrode toward the molten slag at a rate corresponding to the rate at which the electrode is consumed as the refining thereof proceeds;
   a cold hearth beneath the metal refining vessel, the cold hearth being adapted to receive and to hold electroslag refined molten metal in contact with a solid skull of the refined metal formed on the walls of the cold hearth;
   a cold finger orifice below the cold hearth, the cold finger orifice being adapted to receive and to dispense as a stream molten metal processed through the electroslag refining process and through the cold hearth;
   means for atomizing the stream of molten metal passing from the cold finger orifice; and
   means for collecting in a collection station overspray powder produced during atomization and not deposited on a solid receiving surface disposed therein; and
   means joining said collecting means and said refining vessel for recycling said overspray powder directly into said refining vessel for flow through said molten slag.

7. The apparatus of claim 6 wherein the means for advancing the ingot is adapted to advance the ingot to be refined at the rate corresponding to the rate at which the refined molten metal is dispensed from the cold hearth.

8. The apparatus of claim 6 wherein the recycling means are effective for injecting said overspray powder on top of said molten slag.

9. The apparatus of claim 6 wherein the recycling means further comprises:

means, operatively positioned in the electroslag refining apparatus, for dispensing the overspray powder into the refining vessel.

10. The apparatus of claim 6 further comprising:

means, operatively connecting the collecting means and the recycling means, for transporting the overspray powder from the collecting means to the recycling means.

11. The apparatus of claim 6 wherein the transporting means further comprises:

pipe means; and blower means, operatively positioned relative to the collecting means, the recycling means and the pipe means, for transporting the overspray powder from the collecting means to the recycling means.

* * * * *